United States Patent Office 3,287,409
Patented Nov. 22, 1966

3,287,409
5H-DIBENZO[a,d]CYCLOHEPTENE-5-CARBOXAMIDE
Frederick Leonard, Yonkers, and André Gagneux, Hartsdale, N.Y., assignors to Geigy Chemical Corporation, Greenburgh, N.Y., a corporation of Delaware
No Drawing. Filed July 23, 1962, Ser. No. 211,847
1 Claim. (Cl. 260—558)

This invention relates to certain novel derivatives of 5H - dibenzo[a,d]cycloheptene(dibenzo[a,e]cycloheptatriene) and 10,11-dihydro-5H-dibenzo[a,d]cycloheptene (dibenzoz[a,d]cyclohepta[1,4]diene). More particularly, this invention pertains to 5H-dibenzo[a,d]cycloheptene-5-carboxylic acid, -carboxylic acid halide or -carboxamide and 10,11-dihydro-5H-dibenzo[a,d]cycloheptene-5-carboxylic acid, -carboxylic acid halide or -carboxamide which may be represented by the following general formula:

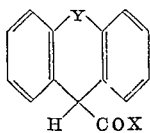

(I)

wherein

Y stands for the ethylene or vinylene group —CH$_2$— —CH$_2$— or —CH=CH—, respectively, and X represents hydroxy, halogen, particularly, chlorine and bromine, or amino.

It is to be understood that the alkali and alkaline earth metal salts of the carboxylic acid within the above formula, as well as any other obvious and equivalent salts thereof, are within the concept and scope of the instant invention.

The compounds of this invention may be conveniently synthesized in the following manner:

In a first step, 2-(phenylethyl)benzoic acid is prepared by hydrogenating benzylidene-phthalic anhydride, prepared from phthalic anhydride and phenylacetic acid; in a second step, the compound obtained is treated with polyphosphoric acid to effect cyclization to 10,11-dihydro-5H-dibenzo[a,d]cycloheptene-5-one; as a third step, 10,11-dihydro-5H-dibenzo[a,d] cycloheptene is produced by refluxing the above ketone in lower alkanol in the presence of sodium; and in a further step refluxing the product of step four with butyl-lithium gives the desired 10,11 - dihydro-5H-dibenzo[a,d]cycloheptene-5-carboxylic acid after addition of carbon dioxide.

To obtain a 5H-dibenzo[a,d]cycloheptene-5-carboxylic acid, the product of step three is halogenated and subsequently dehydrohalogenated to yield the 5H-dibenzo[a,d]cycloheptene, which when treated with butyl-lithium and carbon dioxide, as described above, gives the desired carboxylic acid.

The corresponding 5-carboxylic acid halides and 5-carboxamides are prepared in the ordinary manner by sequent treatment with a halide of a negative element, such as sulfur or phosphorus, and ammonia.

This synthesis may be graphically illustrated by the following equations:

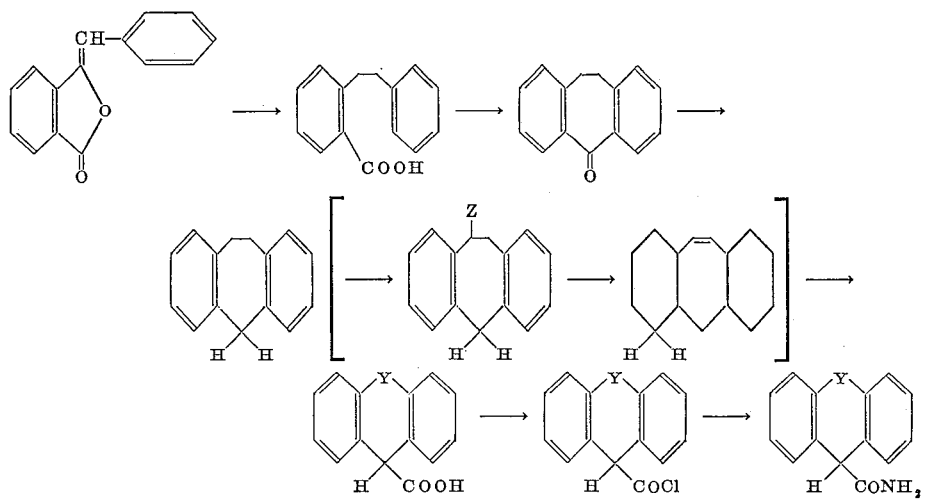

The symbol Y in the above formulae has the significance ascribed to it hereinabove and Z is halogen.

More specifically, the subject compounds may be made in accordance with the following more detailed process description.

(1) Benzylidene-phthalic anhydride prepared from phthalic anyhdride and phenylacetic acid according to Org. Synth. Coll., vol. 2, J. Wiley, N.Y., 1943, p. 61, is hydrogenated in absolute dioxane in the presence of a nickel-catalyst until the hydrogenation is completed and 2-phenylethyl benzoic acid is obtained.

(2) To this benzoic acid derivative 85 percent polyphosphoric acid is added at about 100° C. The reaction mixture is then stirred for about two hours. 10,11-dihydro-5H-dibenzo[a,d]-cycloheptene-5-one is obtained in consequence of this procedure.

(3) By adding sodium in absolute ethanol to this ketone under dry nitrogen with vigorous stirring, 10,11-dihydro-5H-dibenzo[a,d]cycloheptene is formed after refluxing for about ½ hour to about four hours and preferably for about one hour.

(4a) The desired carboxylic acid, 10,11 - dihydro-5H-dibenzo[a,d]cycloheptene-5-carboxylic acid, is made by adding butyl-lithium in wax to a mechanically stirred solution of the reaction product of step three in absolute ether under dry oxygen-free nitrogen, refluxing the reaction mixture for about ½ hour to about four hours and then adding carbon dioxide to the reaction mixture.

(4b) The desired 5H-dibenzo[a,d]cycloheptene-5-carboxylic acid is obtained, for example, by (1) brominating the product of step three by means of N-bromo-succinimide in the presence of benzoyl peroxide dissolved in carbon tetrachloride under reflux conditions, (2) dehydrobrominating the compound obtained by heating with pyridine, and (3) treating the 5H-dibenzo[a,d]cyclopheptene thus formed as described under 4a above.

(5) By treating the above carboxylic acids with, for example, thionyl halides or phosphorous halides, the corresponding 5-carboxylic acid halide derivatives are obtained which can be converted to the 5-carboxamide derivatives by treatment with ammonia.

The subject compounds are valuable and useful in further chemical synthesis. Particularly, they can be employed as starting materials in the synthesis of, for example, dialkylaminoalkyl 5H-dibenzo[a,d]cycloheptene-5-carboxylates or N - (dialkylaminoalkyl)-5H-dibenzo[a,d]cycloheptene - 5 - carboxamides and the corresponding 10,11-dihydro compounds.

Such compounds may be prepared readily by reacting the carboxylic acids or acid halides encompassed by Formula I with a dialkylamino alkanol or -alkyl halide. More specifically, the above 5-carboxylate derivatives are prepared by refluxing the carboxylic acids or acid chlorides with a dialkylamino alkyl halide or with a dialkylamino alkanol, respectively, and the above 5-carboxamide derivatives are made by refluxing the carboxylic acid chlorides with a N,N-dialkyl-alkylenediamine.

Such derived compounds which may be represented by the following general formula:

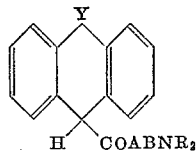

wherein

A represents O or NH,
B stands for lower alkylene,
R means lower alkyl,
Y is as defined hereinabove, possess valuable pharmaceutical properties. More particularly, they exhibit anti-convulsant, spasmolytic and antiepileptic activity and can thus be used as anti-convulsant, spasmolytic and antiepileptic agents. Merely by illustration, β-diethylaminoethyl 10,11-dihydro-5H-dibenzo[a,d]cycloheptene-5-carboxylate hydrochloride provides, for example, when administered to mice in doses of 100 mg./kg. p.o., 100 percent protection against electroshock for more than 4½ hours and delays at the same dose the onset of convulsions and death brought about by metrazole.

However, compounds of Formula I wherein X denotes amino, i.e., 5-carboxamide derivatives, possess also utility per se as physiologically active agents. To illustrate, 10,11 - dihydro - 5H - dibenzo[a,d]cycloheptene-5-carboxamide, exhibits anti-convulsant, spasmolytic and antiepileptic activity and it can thus be used as anti-convulsant, spasmolytic and anti-epileptic agent. This compound, for instance, when administered to mice in doses of 250 mg./kg. p.o., provided protection against electroshock for 6 hours.

Furthermore, the 5-carboxylic acids comprised by Formula I are useful as rust or corrosion inhibitors.

These new compounds, the methods for their preparation and their use in further chemical synthesis may be exemplified more fully by the following illustrative examples. The temperatures therein are given in degrees centigrade.

EXAMPLE 1

*10,11-dihydro-5H-dibenzo[a,d]cycloheptene-5-carboxylic acid*

(1) *2-(phenylethyl)-benzoic acid.*—Benzylidene-phthalic anhydride (33 g., 1.5 moles) prepared according to Org. Synth. Coll., vol. 2, J. Wiley, N.Y., 1943, p. 61, was hydrogenated in 250–300 ml. of absolute dioxane, obtained peroxide-free by chromatography on basic aluminum oxide, in the presence of 60 g. Girdler stabilized nickel-catalyst. The starting hydrogen pressure was 1700 p.s.i. at 25° C., corresponding to 2880 p.s.i. at 400° K. After shaking for three hours at the latter temperature the pressure was 1330 p.s.i., corresponding to a hydrogen uptake of 92%. The crude, crystalline reaction mixture was washed out with absolute dioxane, filtered through Celite and evaporated. Dissolving the resulting residue in 5 N ammonia-water, filtration and precipitation with conc. HCl at 0° under vigorous stirring resulted in 265 g., 78% slightly beige crystals, M.P. 118–125°; $\nu(CCl_4)$ C=O 1770 and 1690 cm.$^{-1}$. Recrystallization from ether/pentane gave 249 g. 73%, pure phenylethylbenzoic acid; M.P. 128–130°, $\nu(CCl_4)$ C=O 1760 cm.$^{-1}$, $\epsilon$(MeOH) 2780 A., 1300, equivalent weight calc. 226, found 227.

(2) *10,11-dihydro-5H-dibenzo[a,d]cycloheptene-5-one.*—2-(phenylethyl)-benzoic acid (90.4 g., 0.4 mole) was added to 4 kg. of 85% polyphosphoric acid at 100°. After stirring at this temperature for 2 hours the reaction mixture was poured on 4 kg. ice with stirring and extracted with three 1 lt. portions of ether. The combined extracts were washed twice with 500 ml. of 2 N $Na_2CO_3$, thrice with 500 ml. of icewater, dried over $MgSO_4$ and evaporated. Distillation of the brown residue yielded 70 g., 84%, of the desired ketone, B.P. 0.4 torr 145°, $n_D^{25}$ 1.6330–1.6332; M.P. 32–33° (from MeOH at 0°), $\nu$ (liq.) C=O 1650 cm.$^{-1}$; $\epsilon$ (MeOH) 2670 A., 16,000; $\epsilon$ (cyclohex.) 2630 A., 18,000; $\epsilon$ (isooctane) 2640 A., 16,600.

(3) *10,11 - dihydro-5H - dibenzo[a,d]cycloheptene.*—Sodium (46.0 g., 2.00 moles) was added to 45.0 g. (0.216 mole) of the above ketone in 900 ml. absolute ethanol under dry nitrogen with vigorous stirring. After refluxing for 30 min. the reaction mixture was cooled, treated with 1 lt. of icewater and extracted with two 2 lt. of portions of ether. The organic phase was then washed twice with 1 lt. water, dried over $MgSO_4$ and evaporated. Crystallization of the residue from ethanol yielded 29.56 g., 70%, of the desired reaction product; M.P. 72–75°.

(4) *10,11 - dihydro-5H - dibenzo[a,d]cycloheptene-5-carboxylic acid.*—Butyl-lithium (44.00 g., 0.137 mole, 20.0%) in wax was added to a magnetically stirred solution of 22.40 g. (0.115 mole) of the above cycloheptene in 250 ml. absolute ether under dry, oxygen-free (Fieser solution) nitrogen. After heating to reflux for 1.5 hours the brown mixture was added to 300 g. finely crushed $CO_2$ under vigorous stirring and simultaneous addition of 500 ml. of absolute ether. Stirring was continued on a water-bath for 30 min., after which all the $CO_2$ had evaporated. Addition of 300 ml. 0.4 N $Na_2CO_3$ solution was followed by washing with three 250 ml. portions of ether. Separation and acidification of the aqueous phase with ice cold 2 N HCl under 500 ml. ether, extraction with another 500 ml. of ether, drying of the organic phase over $MgSO_4$, evaporation and recrystallization from $CHCl_3$/pentane gave 17.95 g., 66%, of the desired carboxylic acid; M.P. 215–218°, $\nu$ KBr C=O, 1690 cm.$^{-1}$.

Analysis for $C_{16}H_{14}O_2$ (M.W. 238.27): Calc'd: C, 80.63; H, 5.92. Found: C, 80.88; H, 6.23.

EXAMPLE 2

*10,11-dihydro-5H-dibenzo[a,d]cycloheptene-5-carboxylic acid chloride*

The carboxylic acid of Example 1 (2.38 g., 0.01 mole) was refluxed in 20 ml. of thionyl chloride with magnetic stirring under argon for one hour. After evaporation to dryness and recrystallization from pentane, 2.0 g. (78%) of the desired acid chloride was obtained; M.P. 64–65°, $\nu$ C=O, $CHCl_3$ 1800, 1775 cm.$^{-1}$, $CHCl_3$ 3.02 (8H), 5.08 (1H), 7.04 (4H).

EXAMPLE 3

*10,11-dihydro-5H-dibenzo[a,d]-cycloheptene-5-carboxamide*

10,11-dihydro-5H - dibenzo[a,d]cycloheptene-5-carboxylic acid (5 g.) were dissolved in 50 ml. of benzene and treated slowly with 10 ml. of thionyl chloride. The mixture was refluxed for 18 hours and concentrated to a syrupy residue in vacuo, which was taken up in benzene and again concentrated to a syrup. The syrup was dissolved in 50 cc. of benzene, cooled to 5° and saturated with $NH_3$ gas. The precipitate was filtered off and washed well with water. After recrystallization from a mixture of water and alcohol, the desired product was obtained as white crystals. Yield 2 g.; M.P. 185–186°.

Analysis for $C_{16}H_{15}NO$: Calc'd: C, 80.98; H, 6.37; N, 5.90. Found: C, 80.90; H, 6.41; N, 5.92.

EXAMPLE 4

*N-2-(diethylaminoethyl) - 10,11-dihydro-5H-dibenz[a,d] cycloheptene - 5 - carboxamide hydrochloride monohydrate*

10,11-Dihydro - 5H-dibenzo[a,d]cycloheptene - 5-carboxylic acid (9.2 g., 0.04 mole) was dissolved in 160 cc. of benzene and treated slowly with 20 cc. of thionyl chloride. The mixture was refluxed for 18 hours and concentrated to a syrup residue in vacuo, which was taken up in benzene and again concentrated to a syrup. The syrup was dissolved in 100 cc. of benzene and 4.7 g. (0.04 mole) of N,N-diethylethylenediamine in 500 cc. of benzene was added dropwise at room temperature. The reaction mixture was stirred and refluxed for 4 hours. Upon cooling crystals separated, which, after recrystallization from a mixture of isopropanol and ethanol 8:2, melted at 133–135°; yield 6.7 g.

Analysis for $C_{22}H_{31}ClNO_2O_2$: Calc'd: C, 67.76; H, 8.00; N, 7.16. Found: C, 67.79; H, 8.35; N, 7.00.

What is claimed is:
A compound of the formula

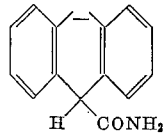

References Cited by the Examiner

Cristol et al.: "J. Am. Chem. Soc.," vol. 82, pages 6155–6162 (1960).

Winthrop et al.: "J. Org. Chem.," vol. 27, pages 230–240 (1962).

WALTER A. MODANCE, *Primary Examiner.*

LEON ZITVER, RICHARD K. JACKSON, ROBERT PRICE, NATALIE TROUSOF, *Assistant Examiners.*

UNITED STATES PATENT OFFICE
CERTIFICATE OF CORRECTION

Patent No. 3,287,409                          November 22, 1966

Frederick Leonard et al.

It is hereby certified that error appears in the above numbered patent requiring correction and that the said Letters Patent should read as corrected below.

Column 2, the sixth structural formula should appear as shown below instead of as in the patent:

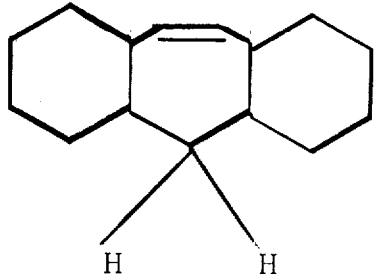

column 5, line 21, for "syrup" read -- syrupy --; column 6, line 5, for "Analysis for $C_{22}H_{31}ClNO_2O_2$:" read -- Analysis for $C_{22}H_{31}ClN_2O_2$: --.

Signed and sealed this 7th day of November 1967.

(SEAL)
Attest:

EDWARD M. FLETCHER, JR.                    EDWARD J. BRENNER
Attesting Officer                           Commissioner of Patents